United States Patent
Deshler

[19]

[11] Patent Number: 6,158,701
[45] Date of Patent: Dec. 12, 2000

[54] PAINTING STAND FOR VEHICLE PARTS

[76] Inventor: Donald T. Deshler, 414 N. Cambridge St., Orange, Calif. 92866

[21] Appl. No.: 09/390,502

[22] Filed: Sep. 3, 1999

[51] Int. Cl.[7] .................................................... F16M 11/00
[52] U.S. Cl. ......................................... 248/127; 248/125.1
[58] Field of Search ................................ 248/127, 122.1, 248/124.1, 124.2, 125.1, 125.3, 125.7, 125.8, 125.9, 129

[56] References Cited

U.S. PATENT DOCUMENTS

| | | | |
|---|---|---|---|
| 1,957,210 | 5/1934 | Heidbrinic | 248/125.1 |
| 3,071,253 | 1/1963 | Walsh | 248/125.1 |
| 5,479,953 | 1/1996 | Pasulka | 248/129 |

FOREIGN PATENT DOCUMENTS 155654 6/1995 Japan .

*Primary Examiner*—Alvin Chin-Shue
*Attorney, Agent, or Firm*—Roy A. Ekstrand

[57] ABSTRACT

A painting stand for vehicle parts includes a base frame supported by a plurality of casters together with a vertically supported post. A post extension is telescopically supported within the vertical post and is adjustable in its elevation. The upper end of the post extension is coupled to a pivotal support which in turn supports an arm and an elongated handle. The arm is joined to a pair of spaced apart generally parallel cross members. A pair of angularly disposed wings having curved lower ends are joined to the cross members and support respective elongated attachment bars extending between the curved lower ends and the uppermost cross member. Each attachment bar defines a plurality of apertures which facilitate securing various automotive or other vehicle body parts and components to the support rack formed by the cross members and angled wings.

12 Claims, 4 Drawing Sheets

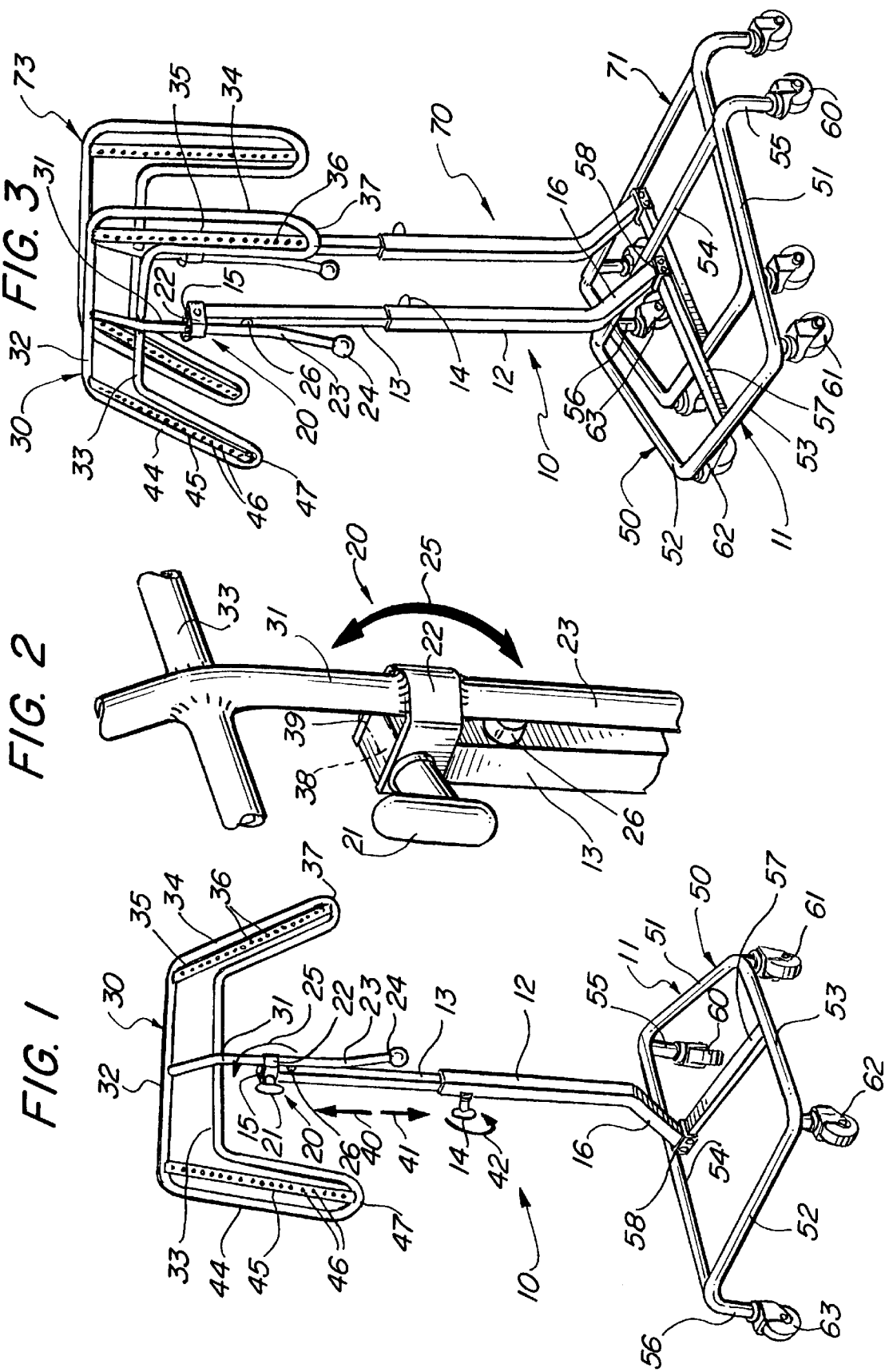

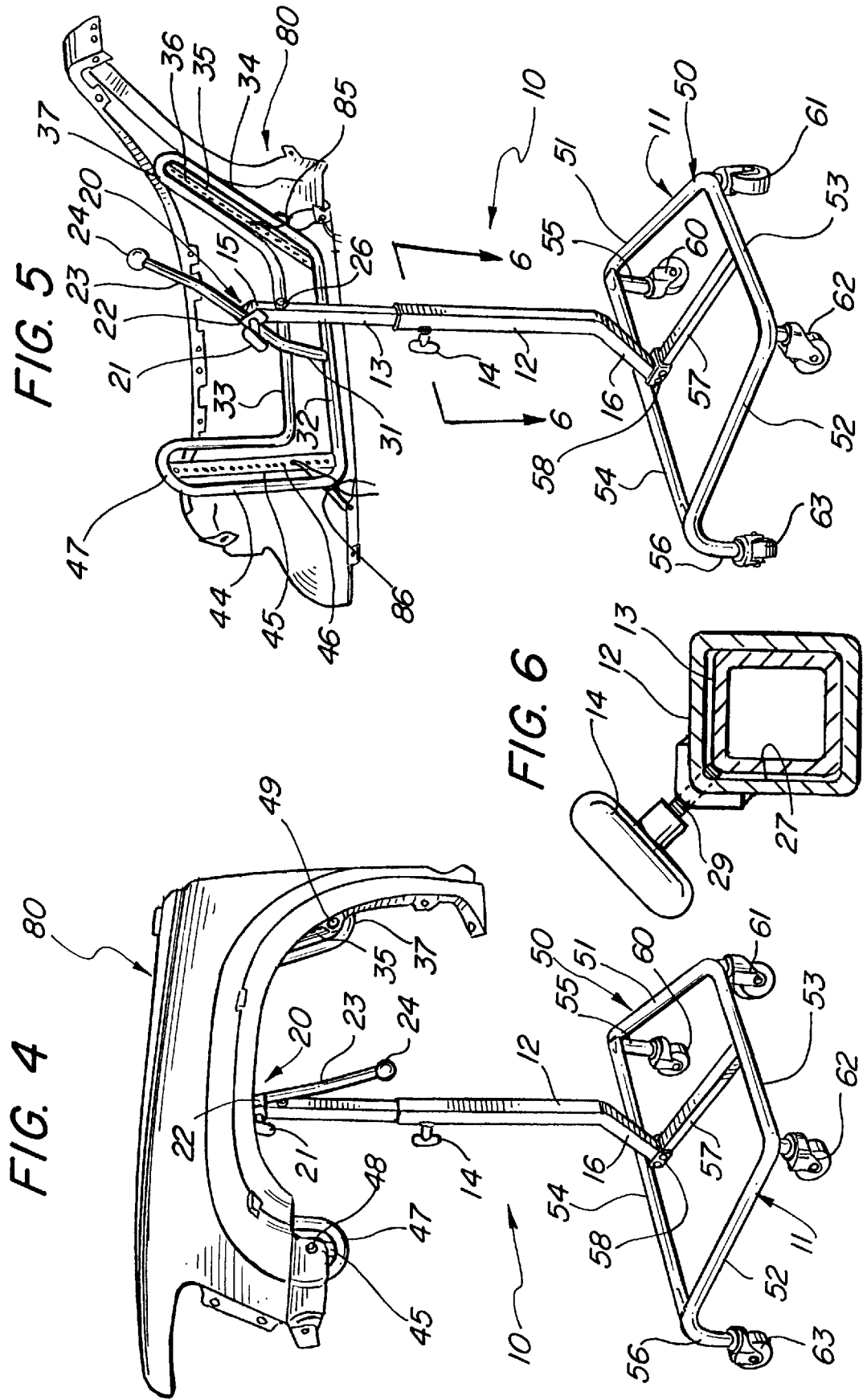

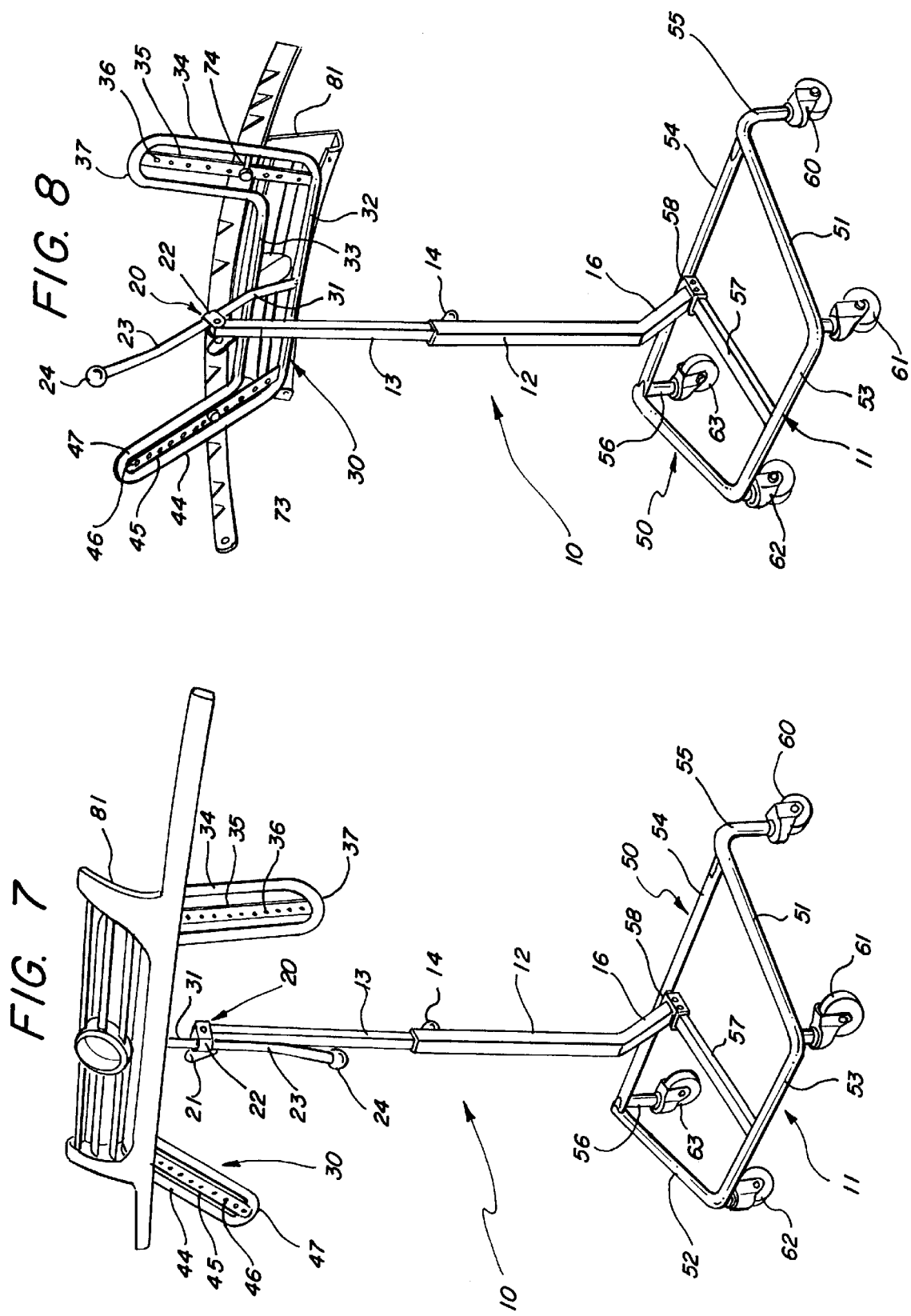

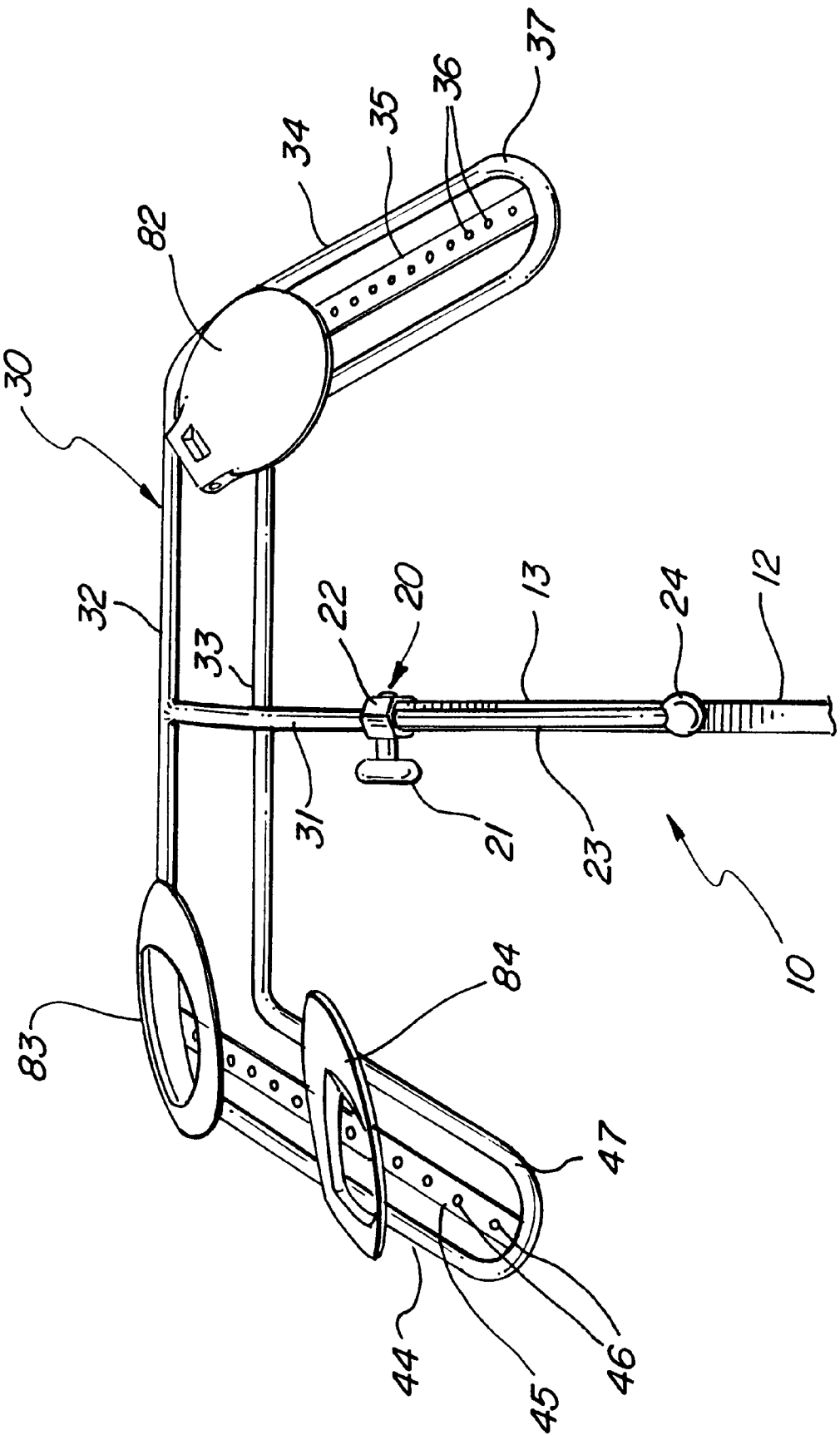

PAINTING STAND FOR VEHICLE PARTS

FIELD OF THE INVENTION

This invention relates generally to painting apparatus and processes for applying high quality automotive type paints to automobiles and other vehicles such as trucks or vans or the like. This invention relates more particularly to devices known generally as painting stands for use in supporting articles of body work or the like during the paint application process.

BACKGROUND OF THE INVENTION

In many facilities engaged in activities such as auto body repair, auto restoration, truck body repair, and auto or van customizing, a need arises to paint some or all of the automobile, truck or van body parts. In most cases in which a high quality paint finish is desired, the need arises to separate the plurality of body components and accessory items such as fenders, bumpers, hood, trunk, trim pieces and fuel access door covers for the painting process. This disassembly of component body parts and accessories is undertaken to ensure that a high quality paint finish will be applied to major panel surfaces and to the surrounding edges of each body component. The painted pieces and components are then reassembled onto the vehicle resulting in a high quality paint job.

The paints utilized in such automotive and other vehicle painting processes are highly specialized paints formulated to provide an extremely high gloss smooth even finish free of defects and exhibiting great luster. As a result, the painting process must be undertaken with great skill and care to avoid defects such as runs or overspray which are exaggerated on such high luster paint applications.

In a typical painting facility of the type used in automotive truck and van body painting, a separate painting area usually enclosed and often referred to as a spray booth is provided. The enclosure of the spray booth helps to control the painting environment and provide the necessary lighting and ventilation for the painting application. In addition, the filtering systems operative upon the spray booth minimize the amount of dust or other airborne particles within the environment. In addition, one or more air-driven spray guns each coupled to a supply of compressed air by long flexible hoses are operated to apply the paint itself.

The art of spraying such high gloss mirror-like finishes on the often multiply curved multiply faceted components typical of vehicle body parts is a matter of great training and skill. A major factor in achieving such skillful paint spraying is the provision of proper lighting together with the ability to easily move and reorient the articles being painted. A skilled spray painter watches the light reflected off an article as the paint is sprayed thereon to gage application of the paint. Preferably, the article being sprayed is movable to be viewed at a critical angle which allows the spray painter to observe reflection off the accumulating paint. The paint spraying activity is a demanding activity in which mistakes and mishaps can be extremely costly to rectify. One of the more critical elements in this demanding environment of the spray booth is the painting stand used to hold the article or articles being painting. Ideally, the paint stand supports the article or articles being painted in a manner which avoids entanglement with the plurality of compressed air hoses operating the spray gun or spray guns as the painter moves about while providing easy preferably one-handed manipulation of the supported part by the painter.

Faced with the critical need for aiding spray painters in painting such body parts or articles, practitioners in the art have provided a virtually endless variety of paint stands known under different brand and product names. Some of these devices are highly specialized being specifically designed for a single type of article such as bumpers or the like. Others, however, are more generally fabricated for use on a variety of articles and are little more than supporting racks having a plurality of hooks extending therefrom for hanging parts during painting.

One such typical painting stand is manufactured by Brut Manufacturing Company in Navarre, Ohio under the product name Deluxe Bump-Bench which provides a plurality of converging upwardly extending U-shaped elements supported by a center post on a rolling base. A tilt handle secured to the base is provided for portability.

Other similar devices manufactured by KNO:GREEF MANUFACTURING in Edmonton, AB Canada under the product Ultimate Auto Body Parts Stand provides a combination stand for a variety of parts having a T-shaped base and an extending center post which vertically supports a multiply articulated arm set for receiving and securing the to-be-painted articles.

Examples of more generally used rack-like devices are provided by DAR-A-CON Industries, Inc. in Monett, Mo. under various product names such as Tilt Table and Portable Scissors Table.

A typical paint stand of highly specialized use for supporting vehicle bumpers is manufactured by Steck Manufacturing Company under the product name Bumper Tree which provides a paint stand having a fixed X-shaped base supporting a vertical post upon which a similar X-shaped member is supported for receiving bumpers or similar articles.

While the prior art devices such as those described and identified above have provided some improvement in the art and enjoyed in some instances commercial success, they are generally limited in their functionality and are, for the most part, subject to several faults. For example, such devices often fail to provide a solution to the vexing problem of involvement or entanglement with the compressed air hoses utilized in supplying compressed air to the paint sprayers within the booth. This problem is major in its impact in that a typical spray painter often becomes fully involved in paint application and spray gun manipulation moving about the articles being painted and fails to prevent the entanglement of such hoses. One unfortunate tug on an entangled hose which tips over a paint stand having articles thereon can erase much of the profit anticipated in the painting activity. Other limitations found in the prior art devices is their need to be so highly specialized in structure that a great number of such devices are required within the spray booth. This, of course, tends to clutter the booth and make painting activities more difficult. A still further limitation of the prior art devices is their tendency to occupy a great deal of space within the facility when not in use. Finally, and perhaps most critically, such prior art devices fail to provide easy one-hand manipulation of the articles during painting necessary for an efficient and high quality painting operation.

Thus, there remains an unresolved and unfulfilled need in the art for a more efficient, cost effective, versatile and useful painting stand.

SUMMARY OF THE INVENTION

Accordingly, it is a general object of the present invention to provide an improved painting stand for vehicle parts. It is a more particular object of the present invention to provide an improved painting stand for vehicle parts which is extremely versatile and effective in supporting a plurality of differently shaped parts and body components in a variety of orientations. It is a still further object of the present invention to provide an improved painting stand for vehicle parts which is capable of compact, space-saving storage by being fabricated for nesting with other similarly fabricated painting stands.

In accordance with the present invention, there is provided a painting stand for supporting one or more vehicle body parts or accessories for spray painting, the painting stand comprising: a base having a base frame and a plurality of casters for rollingly supporting the base; a vertical post supported by the base frame and extending upwardly therefrom; a post extension slidably supported by the vertical post and having an upper end; height adjustment means for securing the post extension to the vertical post at a selected height; a support rack having a pair of cross members and a pair of wings each having a lower portion and an elongated attachment bar defining a plurality of apertures therein; an arm joined to the cross member at one end and forming a handle at the remaining end; a pivotal attachment pivotally securing the arm and the handle to the upper end of the post extension; and means for adjusting the frictional resistance of the pivotal attachment.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a painting stand for vehicle parts constructed in accordance with the present invention;

FIG. 2 sets forth an enlarged partial perspective view of the pivotal support portion of the present invention painting stand for vehicle parts;

FIG. 3 sets forth a perspective view of a pair of painting stands for vehicle parts in a nested storage relationship;

FIG. 4 sets forth a perspective view of the present invention painting stand for vehicle parts supporting a typical vehicle fender;

FIG. 5 sets forth a perspective view of the present invention painting stand for vehicle parts supporting the typical fender shown in FIG. 4 in an inverted tilted position;

FIG. 6 sets forth a section view of the present invention painting stand taken along section lines 6—6 in FIG. 5;

FIG. 7 sets forth a front perspective view of the present invention painting stand supporting a further exemplary auto body part;

FIG. 8 sets forth a perspective view of the painting stand and auto vehicle part shown in FIG. 7 in an inverted and tilted orientation; and FIG. 9 sets forth a partial perspective view of the present invention painting stand supporting a plurality of small vehicle parts.

DESCRIPTION OF THE PREFERRED EMBODIMENT

FIG. 1 sets forth a front perspective view of a painting stand constructed in accordance with the present invention and generally referenced by numeral 10. Painting stand 10 is preferably fabricated of a rigid material such as steel or other metals or equivalent materials and includes a base portion 11 supporting a vertical post 12 within which a post extension 13 is telescopically supported. The upper end of post extension 13 is secured to a pivot generally referenced by numeral 20 which supports a handle 23 and an arm 31. Handle 23 terminates in a suitable knob 24 while arm 31 is joined to a pair of transverse cross members 32 and 33. The joining or attachment of cross members 32 and 33 to arm 31 is preferably provided by conventional welding attachment or its equivalent. Alternatively, however, cross members 32 and 33 may be joined to arm 31 using other secure attachments such as fasteners or the like if preferred. Cross members 32 and 33 form the transverse portions of a support rack which further includes a pair of downwardly extending and outwardly angled wings 34 and 44. Wing 34 includes a generally U-shaped member defining a curved lower end 37 which is joined to and preferably continuous with cross members 32 and 33. An attachment bar 35 having a plurality of apertures 36 formed therein is secured within wing 34. Similarly, wing 44 is generally U-shaped having a curved end 47 and upper portions joined to and preferably contiguous with cross members 32 and 33. Wing 44 further includes an attachment bare 45 joined thereto which defines a plurality of apertures 46 therein.

The structure of pivot 20 is better seen in the enlarged partial perspective of FIG. 2. However, suffice it to note here that pivot 20 includes a generally U-shaped pivot bracket 22 secured to arm 31 and handle 23 in a secure attachment such as welding or the like. Pivot bracket 22 extends on either side of upper end 15 of post extension 13. A handle 21 is threadably secured to bracket 22 passing through end 15 by conventional attachment means (not shown).

As mentioned above and as is better seen in FIG. 6, post extension 13 is telescopically received within post 12 to facilitate vertical movement of post extension 13 and height adjustment of support rack 30. The desired height of support rack 30 may be maintained by a lock handle 14 which as is also better seen in FIG. 6 is threadably supported within post 12 and operates to lock the vertical position of post extension 13 within post 12.

Painting stand 10 further includes a base generally referenced by numeral 11 having a generally trapezoidal base frame 50 preferably formed of a rigid steel material or the like and having angled sides 51 and 52 together with a front portion 53 and a rear portion 54. Angled sides 51 and 52 extend downwardly on each side of rear portion 54 terminating in downwardly extending end portions 55 and 56. Base frame 50 further includes a center brace 57 having a bracket 58 secured thereto. Brace 57 is rigidly joined to front portion 53 and rear portion 54 using a conventional weld attachment or the like. An angle portion 16 extends downwardly and rearwardly from the lower end of post 12 and is received within bracket 58 and is secured thereto using conventional fasteners or other equivalent attachment. Base 11 further includes a pair of front casters 61 and 62 and a pair of rear casters 60 and 63. Casters 60 through 63 are fabricated of conventional fabrication casters and are, in accordance with conventional fabrication, freely swivel in accordance with the direction of movement of painting stand 10.

In the manner set forth below in greater detail, support rack 30 is used to secure one or more to-be-painted articles which are then manipulated by the user through movement of handle 23 about pivot 20 and through adjustment of the heighth of support rack 30. It will be recalled that the latter function is provided by loosening lock handle 14 and moving post extension 13 with respect to post 12 and thereafter turning lock handle 14 to secure post extension 13 within post 12. Thus, the position of support rack 30 is vertically adjusted up or down in the directions indicated by arrows 40 and 41 by twisting lock handle 14 and moving post extension 13. Further, the angular position of support rack 30 and thus the corresponding angular position of to-be-painted articles secured thereto is adjusted by manipulation of handle 23 pivoting handle 23 and arm 31 about pivot 20 as indicated by arrow 25. In many instances, the user may elect to tighten pivot handle 21 to a sufficient tightness to maintain each selected pivotal position of handle 23 and arm 31 leaving the user able to adjust the angular position of support rack 30 using a single hand upon handle 23 and knob 24. Alternatively, the user may loosen pivot handle 21 and select an angular position for support rack 30 and thereafter securely tighten pivot handle 21 as desired.

In further accordance with an important aspect of the present invention, the orientation and structure of wings 34 and 44 upon support rack 30 facilitates the support of a wide variety of differently shaped body portions and accessory items upon the support rack. In addition, and by way of further advantage of the present invention, the provision of attachment bars 35 and 45 within wings 34 and 44 having apertures 36 and 46 respectively therein facilitates the attachment of a wide variety of differently shaped body parts to support rack 30 and adds substantial flexibility to the use of painting stand 10. Examples of this use are set forth below for purposes of illustration in FIGS. 4, 5, 7, 8 and 9. However, it will be apparent to those skilled in the art that a wide variety of to-be-painted articles may be secured in a correspondingly wide variety of attachments to support rack 30. The use of angled wings 34 and 44 with attachment bars 35 and 45 has proven to be extremely advantageous and flexible in the accommodation of a variety of differently shaped body parts and accessory articles.

Base 11 is fabricated in an advantageous manner in that the use of a plurality of free-wheeling casters (casters 61 through 63) allows painting stand 10 to be easily moved about the paint booth floor by the user maintaining a single hand upon the paint stand. In addition, the use of angle 16 and bracket 58 to secure post 12 together with the shape of base frame 50 and the plurality of casters 60 through 63 greatly enhances the ability of painting stand 10 to operate without unduly engaging or becoming entangled with the conventional compressed air hoses used in typical spray booths.

FIG. 2 sets forth a partial perspective view of painting stand 10 showing the structure of pivot 20. As described above, stand 10 includes a post extension 13 extending upwardly from and supported by post 12 upon base 11 (seen in FIG. 1). As is also described above, post extension 13 defines an end 15 upon which a pivot bracket 22 is secured. Pivot bracket 22 is generally U-shaped having opposed portions on each side of end 13 and having a threaded aperture 39 formed on one side of bracket 22 and a larger aperture (not shown) on the opposite side. While not seen in FIG. 2, it will be understood that end 15 of post extension 13 defines an interior passage aligned with aperture 39.

Pivot 20 further includes a handle 21 supporting a threaded shaft 38. Shaft 38 passes through apertures formed in pivot bracket 22 and threadably engages threaded aperture 39 on the opposite side of bracket 22. As a result, handle 21 may be rotated to tighten shaft 38 within aperture 39 and draw the opposed sides of pivot bracket 22 against end 15 of post extension 13. Alternatively, with handle 21 rotated to loosen the grasping of post extension 13, pivot bracket 22 is pivotable upon end 15 in the directions indicated by arrows 25.

Handle 23 and arm 31 are preferably formed of an integral tubular steel member and pass through pivot bracket 22. Bracket 22 is welded or otherwise joined to arm 31 and handle 23. As a result, the condition of tightening of pivot 20 determines the degree of pivotal movement possible of handle 23 and arm 31 about end 15. Arm 31 is further joined to cross member 33 at a weld junction or other suitable attachment. Thus, with handle 21 rotated so as to tighten the grip of pivot bracket 22 upon end 15, the pivotal or angular position of arm 31 and handle 23 may be fixed at any desired angle. Alternatively, handle 21 may be rotated so as to loosen the grasp of pivot bracket 22 and allow adjustment of the pivotal or angular position of handle 23 and arm 31. In addition and in accordance with a further advantage of the present invention painting stand, the degree of tension applied to pivot bracket 22 upon end 15 may be adjusted between extreme positions of fully clasped and loose adjustments to an intermediate adjustment in which a substantial gripping force is applied upon bracket 22 against end 15 to maintain a frictional force sufficient to maintain the angular position of arm 31 and handle 23 while facilitating movement against this frictional force. In this manner, handle 23 may be moved to pivot arm 31 and released allowing the frictional force of bracket 22 to maintain the adjusted position. This greatly facilitates one-hand operation of the present invention painting stand.

FIG. 3 sets forth a perspective view in which a pair of identically constructed painting stands for vehicle parts generally referenced by numerals 10 and 70 are shown in their stored nested positions. It will be understood that painting A stands 10 and 70 are identical and thus the descriptions of painting stand 10 will be understood to be equally descriptive of painting stand 70. The important aspect of the present invention shown in FIG. 3 is the ability of painting stands 10 and 70 to nest in a compact storage arrangement which in turn saves substantial storage space within the painting facility when such stands are not in use.

More specifically, and as is described above, painting stand 10 is preferably fabricated of a rigid material such as steel or other metals or equivalent materials and includes a base portion 11 supporting a vertical post 12 within which a post extension 13 is telescopically supported. The upper end of post extension 13 is secured to a pivot generally referenced by numeral 20 which supports a handle 23 and an arm 31. Handle 23 terminates in a suitable knob 24 while arm 31 is joined to a pair of transverse cross members 32 and 33. The joining or attachment of cross members 32 and 33 to arm 31 is preferably provided by conventional welding attachment or its equivalent. Alternatively, however, cross members 32 and 33 may be joined to arm 31 using other secure attachments such as fasteners or the like if preferred. Cross members 32 and 33 form the transverse portions of a support rack which further includes a pair of downwardly extending and outwardly angled wings 34 and 44. Wing 34 includes a generally U-shaped member defining a curved lower end 37 which is joined to and preferably continuous with cross members 32 and 33. An attachment bar 35 having a plurality of apertures 36 formed therein is secured within wing 34. Similarly, wing 44 is generally U-shaped having a curved end 47 and upper portions joined to and preferably contiguous with cross members 32 and 33. Wing 44 further includes an attachment bare 45 joined thereto which defines a plurality of apertures 46 therein.

The structure of pivot 20 is better seen in the enlarged partial perspective of FIG. 2. However, suffice it to note here that pivot 20 includes a generally U-shaped pivot bracket 22 secured to arm 31 and handle 23 in a secure attachment such as welding or the like. Pivot bracket 22 extends on either side of upper end 15 of post extension 13. A handle 21 is threadably secured to bracket 22 passing through end 15 by conventional attachment means (not shown).

As mentioned above and as is better seen in FIG. 6, post extension 13 is telescopically received within post 12 to facilitate vertical movement of post extension 13 and height adjustment of support rack 30. The desired height of support rack 30 may be maintained by a lock handle 14 which as is also better seen in FIG. 6 is threadably supported within post 12 and operates to lock the vertical position of post extension 13 within post 12.

Painting stand 10 further includes a base generally referenced by numeral 11 having a generally trapezoidal base frame 50 preferably formed of a rigid steel material or the like and having angled sides 51 and 52 together with a front portion 53 and a rear portion 54. Angled sides 51 and 52 extend downwardly on each side of rear portion 54 terminating in downwardly extending end portions 55 and 56. Base frame 50 further includes a center brace 57 having a bracket 58 secured thereto. Brace 57 is rigidly joined to front portion 53 and rear portion 54 using a conventional weld attachment or the like. An angle portion 16 extends downwardly and rearwardly from the lower end of post 12 and is received within bracket 58 and is secured thereto using conventional fasteners or other equivalent attachment. Base 11 further includes a pair of front casters 61 and 62 and a pair of rear casters 60 and 63. Casters 60 through 63 are fabricated of conventional fabrication casters and are, in accordance with conventional fabrication, freely swivel in accordance with the direction of movement of painting stand 10.

As mentioned, painting stand 70 is identical to painting stand 10. Stand 70 includes a base 71 which is identical to base 11 and a support rack 72 which is identical to support rack 30. The remaining structural features of painting stand 70 are equivalent and substantially or fully identical as shown in FIG. 3. Of importance with respect to the nesting storage feature of the present invention is the manner in which base 11 of stand 10 accommodates a nested base such as base 71 of an additional painting stand such as painting stand 70. This nesting feature is accommodated due to the angular arrangement of sides 51 and 52 of base 11 as well as the raised position of rear portion 54 and the lowered position of front portion 53. This downwardly and forwardly angled configuration of base 11 facilitates the insertion of base 71 therein.

It will be understood that while FIG. 3 shows a single pair of nested painting stands in storage configuration, an additional number of painting stands fabricated in accordance with stands 10 and 70 may be correspondingly nested in sequence in the same manner shown in FIG. 3.

FIG. 4 sets forth a perspective view of the present invention painting stand in a typical use involving the support of a conventional fender 80. Fender 80 is fabricated entirely in accordance with conventional fabrication techniques. As described above, painting stand 10 is preferably fabricated of a rigid material such as steel or other metals or equivalent materials and includes a base portion 11 supporting a vertical post 12 within which a post extension 13 is telescopically supported. The upper end of post extension 13 is secured to a pivot generally referenced by numeral 20 which supports a handle 23 and an arm 31. Handle 23 terminates in a suitable knob 24 while arm 31 is joined to a pair of transverse cross members 32 and 33. The joining or attachment of cross members 32 and 33 to arm 31 is preferably provided by conventional welding attachment or its equivalent. Alternatively, however, cross members 32 and 33 may be joined to arm 31 using other secure attachments such as fasteners or the like if preferred. Cross members 32 and 33 form the transverse portions of a support rack which further includes a pair of downwardly extending and outwardly angled wings 34 and 44. Wing 34 includes a generally U-shaped member defining a curved lower end 37 which is joined to and preferably continuous with cross members 32 and 33. An attachment bar 35 having a plurality of apertures 36 formed therein is secured within wing 34. Similarly, wing 44 is generally U-shaped having a curved end 47 and upper portions joined to and preferably contiguous with cross members 32 and 33. Wing 44 further includes an attachment bare 45 joined thereto which defines a plurality of apertures 46 therein.

The structure of pivot 20 is better seen in the enlarged partial perspective of FIG. 2. However, suffice it to note here that pivot 20 includes a generally U-shaped pivot bracket 22 secured to arm 31 and handle 23 in a secure attachment such as welding or the like. Pivot bracket 22 extends on either side of upper end 15 of post extension 13. A handle 21 is threadably secured to bracket 22 passing through end 15 by conventional attachment means (not shown).

As mentioned above and as is better seen in FIG. 6, post extension 13 is telescopically received within post 12 to facilitate vertical movement of post extension 13 and height adjustment of support rack 30. The desired height of support rack 30 may be maintained by a lock handle 14 which as is also better seen in FIG. 6 is threadably supported within post 12 and operates to lock the vertical position of post extension 13 within post 12.

Painting stand 10 further includes a base generally referenced by numeral 11 having a generally trapezoidal base frame 50 preferably formed of a rigid steel material or the like and having angled sides 51 and 52 together with a front portion 53 and a rear portion 54. Angled sides 51 and 52 extend downwardly on each side of rear portion 54 terminating in downwardly extending end portions 55 and 56. Base frame 50 further includes a center brace 57 having a bracket 58 secured thereto. Brace 57 is rigidly joined to front portion 53 and rear portion 54 using a conventional weld attachment or the like. An angle portion 16 extends downwardly and rearwardly from the lower end of post 12 and is received within bracket 58 and is secured thereto using conventional fasteners or other equivalent attachment. Base 11 further includes a pair of front casters 61 and 62 and a pair of rear casters 60 and 63. Casters 60 through 63 are fabricated of conventional fabrication casters and are, in accordance with conventional fabrication, freely swivel in accordance with the direction of movement of painting stand 10.

In accordance with the present invention, fender 80 is supported upon support rack 30 using wings 34 and 44. In accordance with conventional fabrication of fender 80, a plurality of apertures are formed at various locations on fender 80 which are utilized in securing the fender to a vehicle chassis and body assembly (not shown). In accordance with the anticipated use of the present invention painting stand, selected ones of these apertures are used in combination with attachment bars 35 and 45 (seen in FIG. 1) to secure fender 80 to support rack 30 using standard fasteners such as bolts 48 and 49 shown in FIG. 4. With temporary reference to FIG. 5, additional attachment of fender 80 to wings 34 and 44 is accomplished by wire ties 85 and 86 respectively.

Returning to FIG. 4, fender 80 is fully secured to support rack 30 and wings 34 and 44 allowing the user to position fender 80 as desired by simply manipulating handle 23 and knob 24. As mentioned above, handle 21 controls the tension upon pivot 20 and may be adjusted in accordance with the balance and weight of FIG. 80. Ideally, pivot 20 is tension adjusted to allow the user to angularly position fender 80 by moving handle 23 and allowing the friction of pivot 20 to maintain each angular position selected. It will be recalled that a typical spray painting operation of the type employed upon automobile or other vehicle body components utilizes high luster glossy paints which are optimally applied when the paint sprayer is able to move the article, in this case fender 80, to the desired angle. It will also be recalled that the application of a high quality paint finish to a body component such as fender 80 requires that the various edges and curved portions be fully painted. Toward this end, painting stand 10 allows fender 80 to be positioned in virtually any angular position upon the painting stand for optimum paint finishing.

FIG. 5 sets forth paint stand 10 supporting fender 80 and having support rack 30 pivoted about pivot 20 to facilitate the painting of the lower edge portions of fender 80. Thus, it will be apparent that FIGS. 4 and 5 depict paint stand 10 supporting fender 80 in alternative angular positions.

More specifically, painting stand 10 is preferably fabricated of a rigid material such as steel or other metals or equivalent materials and includes a base portion 11 supporting a vertical post 12 within which a post extension 13 is telescopically supported. The upper end of post extension 13 is secured to a pivot generally referenced by numeral 20 which supports a handle 23 and an arm 31. Handle 23 terminates in a suitable knob 24 while arm 31 is joined to a pair of transverse cross members 32 and 33. The joining or attachment of cross members 32 and 33 to arm 31 is preferably provided by conventional welding attachment or its equivalent. Alternatively, however, cross members 32 and 33 may be joined to arm 31 using other secure attachments such as fasteners or the like if preferred. Cross members 32 and 33 form the transverse portions of a support rack which further includes a pair of downwardly extending and outwardly angled wings 34 and 44. Wing 34 includes a generally U-shaped member defining a curved lower end 37 which is joined to and preferably continuous with cross members 32 and 33. An attachment bar 35 having a plurality of apertures 36 formed therein is secured within wing 34. similarly, wing 44 is generally U-shaped having a curved end 47 and upper portions joined to and preferably contiguous with cross members 32 and 33. Wing 44 further includes an attachment bare 45 joined thereto which defines a plurality of apertures 46 therein.

The structure of pivot 20 is better seen in the enlarged partial perspective of FIG. 2. However, suffice it to note here that pivot 20 includes a generally U-shaped pivot bracket 22 secured to arm 31 and handle 23 in a secure attachment such as welding or the like. Pivot bracket 22 extends on either side of upper end 15 of post extension 13. A handle 21 is threadably secured to bracket 22 passing through end 15 by conventional attachment means (not shown).

As mentioned above and as is better seen in FIG. 6, post extension 13 is telescopically received within post 12 to facilitate vertical movement of post extension 13 and height adjustment of support rack 30. The desired height of support rack 30 may be maintained by a lock handle 14 which as is also better seen in FIG. 6 is threadably supported within post 12 and operates to lock the vertical position of post extension 13 within post 12.

Painting stand 10 further includes a base generally referenced by numeral 11 having a generally trapezoidal base frame 50 preferably formed of a rigid steel material or the like and having angled sides 51 and 52 together with a front portion 53 and a rear portion 54. Angled sides 51 and 52 extend downwardly on each side of rear portion 54 terminating in downwardly extending end portions 55 and 56. Base frame 50 further includes a center brace 57 having a bracket 58 secured thereto. Brace 57 is rigidly joined to front portion 53 and rear portion 54 using a conventional weld attachment or the like. An angle portion 16 extends downwardly and rearwardly from the lower end of post 12 and is received within bracket 58 and is secured thereto using conventional fasteners or other equivalent attachment. Base 11 further includes a pair of front casters 61 and 62 and a pair of rear casters 60 and 63. Casters 60 through 63 are fabricated of conventional fabrication casters and are, in accordance with conventional fabrication, freely swivel in accordance with the direction of movement of painting stand 10.

As mentioned above, the upper portion of fender 80 is secured to attachment bars 35 and 45 of wings 34 and 44 respectively by a pair of wire ties 85 and 86. Wire ties 85 and 86 are formed of virtually any malleable wire and are simply used to secure the upper portion of fender 80 to support rack 30 using conveniently located attachment apertures of fender 80 together with selected apertures of attachment bars 35 and 45. Alternatively, wire ties 85 and 86 may be replaced by simple flexible cord or other suitable material. The important aspect with respect to the present invention is the convenient availability of the pluralities of holes 36 and 46 within attachment bars 35 and 45 which renders this simple attachment convenient and easily accomplished. It should be noted with simultaneous reference to FIGS. 4 and 5 that the combination of angular positioning available by manipulation of handle 23 together with the full rolling support of base 11 of paint stand 10 provided by casters 60 through 63, that virtually any position of fender 80 supported upon paint stand 10 may be achieved which of course greatly increases the utility and flexibility of the present invention painting stand.

FIG. 6 sets forth a section view of paint stand 10 taken along section lines 6—6 in FIG. 5. Of importance in FIG. 6 is the illustration of the mechanism by which the telescoping position of post extension 13 within post 10 is achieved and maintained to adjust the elevation of support rack 30. Thus, post 12 defines a generally square cross-section member having an interior passage 27 formed therein. Post extension 13 having a similar cross-section but reduced sufficiently in size to be receivable within interior passage 27 is slidably movable within post 12. A threaded aperture 28 is formed at one corner of post 12 which receives a threaded shaft 29. Shaft 29 is secured at its outer end to a knob 14 while its inner end extends into interior passage 27. The extension of threaded shaft 29 into interior passage 27 forces post extension 13 against the opposite corner of interior passage 27. This forced position allows the user to assert sufficient force by turning handle 14 to secure post extension 13 at a given position with respect to post 12.

FIG. 7 sets forth a perspective view of paint stand 10 supporting an automotive grille component 81. As described above, painting stand 10 is preferably fabricated of a rigid material such as steel or other metals or equivalent materials and includes a base portion 11 supporting a vertical post 12 within which a post extension 13 is telescopically supported. The upper end of post extension 13 is secured to a pivot generally referenced by numeral 20 which supports a handle 23 and an arm 31. Handle 23 terminates in a suitable knob 24 while arm 31 is joined to a pair of transverse cross members 32 and 33. The joining or attachment of cross members 32 and 33 to arm 31 is preferably provided by conventional welding attachment or its equivalent. Alternatively, however, cross members 32 and 33 may be joined to arm 31 using other secure attachments such as fasteners or the like if preferred. Cross members 32 and 33 form the transverse portions of a support rack which further includes a pair of downwardly extending and outwardly angled wings 34 and 44. Wing 34 includes a generally U-shaped member defining a curved lower end 37 which is joined to and preferably continuous with cross members 32 and 33. An attachment bar 35 having a plurality of apertures 36 formed therein is secured within wing 34. Similarly, wing 44 is generally U-shaped having a curved end 47 and upper portions joined to and preferably contiguous with cross members 32 and 33. Wing 44 further includes an attachment bare 45 joined thereto which defines a plurality of apertures 46 therein.

The structure of pivot 20 is better seen in the enlarged partial perspective of FIG. 2. However, suffice it to note here that pivot 20 includes a generally U-shaped pivot bracket 22 secured to arm 31 and handle 23 in a secure attachment such as welding or the like. Pivot bracket 22 extends on either side of upper end 15 of post extension 13. A handle 21 is threadably secured to bracket 22 passing through end 15 by conventional attachment means (not shown).

As mentioned above and as is better seen in FIG. 6, post extension 13 is telescopically received within post 12 to facilitate vertical movement of post extension 13 and height adjustment of support rack 30. The desired height of support rack 30 may be maintained by a lock handle 14 which as is also better seen in FIG. 6 is threadably supported within post 12 and operates to lock the vertical position of post extension 13 within post 12.

Painting stand 10 further includes a base generally referenced by numeral 11 having a generally trapezoidal base frame 50 preferably formed of a rigid steel material or the like and having angled sides 51 and 52 together with a front portion 53 and a rear portion 54. Angled sides 51 and 52 extend downwardly on each side of rear portion 54 terminating in downwardly extending end portions 55 and 56. Base frame 50 further includes a center brace 57 having a bracket 58 secured thereto. Brace 57 is rigidly joined to front portion 53 and rear portion 54 using a conventional weld attachment or the like. An angle portion 16 extends downwardly and rearwardly from the lower end of post 12 and is received within bracket 58 and is secured thereto using conventional fasteners or other equivalent attachment. Base 11 further includes a pair of front casters 61 and 62 and a pair of rear casters 60 and 63. Casters 60 through 63 are fabricated of conventional fabrication casters and are, in accordance with conventional fabrication, freely swivel in accordance with the direction of movement of painting stand 10.

Grille component 81 is shown secured to support rack 30 and is thus angularly positionable for optimum painting using the positioning afforded by handle 23 and pivot 20. As is better seen in FIG. 8, grille component 81 is secured to wings 34 and 44 using selected ones of apertures 36 and 46 within attachment bars 35 and 45.

Returning to FIG. 7, it will be apparent that grille component 81 is positioned for painting of the frontal surface thereof. Examination of grille component 81 reveals a difficult article for painting in that it includes a number of relatively thin parallelly spaced members and a circular center member. Such articles are particularly difficult to paint due to the plurality of surfaces at different angular orientations to the painter. In accordance with an important advantage of the present invention painting stand, the user is able to grasp handle 23 while continuing to spray paint upon grille component 81 and move handle 23 during the painting process in a one hand adjustment which allows the user to concentrate upon proper application of paint to the difficult component posed by grilled piece 81.

FIG. 8 sets forth a perspective view of painting stand 10 showing support rack 30 angularly positioned to facilitate access to various surfaces upon a supported grille component 81. More specifically, painting stand 10 is preferably fabricated of a rigid material such as steel or other metals or equivalent materials and includes a base portion 11 supporting a vertical post 12 within which a post extension 13 is telescopically supported. The upper end of post extension 13 is secured to a pivot generally referenced by numeral 20 which supports a handle 23 and an arm 31. Handle 23 terminates in a suitable knob 24 while arm 31 is joined to a pair of transverse cross members 32 and 33. The joining or attachment of cross members 32 and 33 to arm 31 is preferably provided by conventional welding attachment or its equivalent. Alternatively, however, cross members 32 and 33 may be joined to arm 31 using other secure attachments such as fasteners or the like if preferred. Cross members 32 and 33 form the transverse portions of a support rack which further includes a pair of downwardly extending and outwardly angled wings 34 and 44. Wing 34 includes a generally U-shaped member defining a curved lower end 37 which is joined to and preferably continuous with cross members 32 and 33. An attachment bar 35 having a plurality of apertures 36 formed therein is secured within wing 34. Similarly, wing 44 is generally U-shaped having a curved end 47 and upper portions joined to and preferably contiguous with cross members 32 and 33. Wing 44 further includes an attachment bare 45 joined thereto which defines a plurality of apertures 46 therein.

The structure of pivot 20 is better seen in the enlarged partial perspective of FIG. 2. However, suffice it to note here that pivot 20 includes a generally U-shaped pivot bracket 22 secured to arm 31 and handle 23 in a secure attachment such as welding or the like. Pivot bracket 22 extends on either side of upper end 15 of post extension 13. A handle 21 is threadably secured to bracket 22 passing through end 15 by conventional attachment means (not shown).

As mentioned above and as is better seen in FIG. 6, post extension 13 is telescopically received within post 12 to facilitate vertical movement of post extension 13 and height adjustment of support rack 30. The desired height of support rack 30 may be maintained by a lock handle 14 which as is also better seen in FIG. 6 is threadably supported within post 12 and operates to lock the vertical position of post extension 13 within post 12.

Painting stand 10 further includes a base generally referenced by numeral 11 having a generally trapezoidal base frame 50 preferably formed of a rigid steel material or the like and having angled sides 51 and 52 together with a front portion 53 and a rear portion 54. Angled sides 51 and 52 extend downwardly on each side of rear portion 54 terminating in downwardly extending end portions 55 and 56. Base frame 50 further includes a center brace 57 having a bracket 58 secured thereto. Brace 57 is rigidly joined to front portion 53 and rear portion 54 using a conventional weld attachment or the like. An angle portion 16 extends downwardly and rearwardly from the lower end of post 12 and is received within bracket 58 and is secured thereto using conventional fasteners or other equivalent attachment. Base 11 further includes a pair of front casters 61 and 62 and a pair of rear casters 60 and 63. Casters 60 through 63 are fabricated of conventional fabrication casters and are, in accordance with conventional fabrication, freely swivel in accordance with the direction of movement of painting stand 10.

In accordance with conventional fabrication techniques, grille component 81 includes a plurality of apertures at various locations on the component piece which are used normally to secure the grille component to the vehicle chassis and body. In accordance with the present invention, selected ones of these apertures are used to temporarily secure grille component 81 to support rack 30. For convenience, a pair of conventional fasteners such as bolts 74 and 73 are utilized in securing grille component 81 to attachment bars 35 and 45 respectively of support rack 30.

FIG. 9 sets forth a partial perspective view of painting stand 10 showing the support of a plurality of small body components and accessories upon support rack 30. As described above, painting stand 10 includes a post 12 supporting a post extension 13 which in turn supports a pivot 20. Pivot 20 includes a handle 21 and a pivot bracket 22 secured to a handle 23 having a knob 24 thereon together with an arm 31. Arm 31 is joined to cross members 32 and 33 of support rack 30. As is also described above, support rack 30 includes a pair of angularly disposed wings 34 and 44 having attachment bars 35 and 45 respectively and curved ends 37 and 47. Attachment bars 35 and 45 define respective pluralities of apertures 36 and 46.

In the configuration shown in FIG. 9, a fuel access door 82 is secured to attachment bar 35 using a wire tie on the underside thereof (not shown). Additionally, small components 83 and 84 are also secured at convenient points upon wing 44. Thus, painting stand 10 may be used to simultaneously paint a plurality of small body components and accessories by supporting such body components and accessories as spaced apart positions upon support rack 30.

What has been shown is a painting stand for vehicle parts which provides a base supported by a plurality of casters for rolling support together with a vertically extending post having a telescoping post extension movable therein and securable at selected elevations. A support rack is pivotally secured to the upper end of the post extension and is supported by an arm having a handle extending therefrom. The support rack includes a pair of spaced apart cross members and a pair of angularly disposed wing portions each having attachment bars defining pluralities of apertures therein. The painting stand shown is suitable for use in painting a wide variety of vehicle body parts and components and facilitates the angular movement of the supported vehicle body parts for optimum paint coverage and paint finish.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A painting stand for supporting one or more vehicle body parts or accessories for spray painting, said painting stand comprising:
    a base having a base frame and a plurality of casters for rollingly supporting said base;
    a vertical post supported by said base frame and extending upwardly therefrom;
    a post extension slidably supported by said vertical post and having an upper end;
    height adjustment means for securing said post extension to said vertical post at a selected height;
    a support rack having a pair of cross members and a pair of wings each having a lower portion and an elongated attachment bar defining a plurality of apertures therein;
    an arm joined to said cross member at one end and forming a handle at the remaining end;
    a pivotal attachment pivotally securing said arm and said handle to said upper end of said post extension; and
    means for adjusting the frictional resistance of said pivotal attachment.

2. The painting stand set forth in claim 1 wherein said wings are generally U-shaped having upper legs joined to said cross members.

3. The painting stand set forth in claim 2 wherein said lower portions of said wings are generally curved and wherein said elongated attachment bars each have a lower end joined at the approximate center of said curved lower portions and an upper end joined to one of said cross members.

4. The painting stand set forth in claim 3 wherein said wings are angled outwardly from said cross members such that said lower portions are farther apart than said upper legs.

5. The painting stand set forth in claim 4 wherein said pivotal attachment includes:
    a generally U-shaped bracket joined to said arm and said handle and extending across said upper end of said post extension;
    a threaded shaft passing through said bracket; and
    a handle secured to said threaded shaft.

6. The painting stand set forth in claim 5 wherein said base is generally trapezoidal having a front bar, a rear bar and side bars which angle inwardly from said rear bar to said front bar.

7. The painting stand set forth in claim 6 wherein said rear bar is higher than said front bar and said side bars are angled downwardly from said rear bar to said front bar.

8. The painting stand set forth in claim 1 wherein said wings are angled outwardly from said cross members such that said lower portions are farther apart than said upper legs.

9. The painting stand set forth in claim 1 wherein said base is generally trapezoidal having a front bar, a rear bar and side bars which angle inwardly from said rear bar to said front bar.

10. The painting stand set forth in claim 9 wherein said rear bar is higher than said front bar and said side bars are angled downwardly from said rear bar to said front bar.

11. The painting stand set forth in claim 10 wherein said vertical post includes an angled lower portion extending forwardly and upwardly from said base.

12. A painting stand for supporting one or more vehicle body parts or accessories for spray painting, said painting stand comprising:
    a support rack for receiving a vehicle body part or accessory having at least one horizontally disposed cross member, a pair of wings defining generally U-shaped portions joined to said at least one cross member and extending outwardly and downwardly therefrom;
    a base having a plurality of casters;
    a height adjustable post supported by said base and having an upper end;

an arm joined to said at least one cross member; and pivot means for pivotally securing said arm to said upper end of said height-adjustable post, wherein each of said wings includes an elongated attachment bar defining a plurality of apertures therein extending through the center of said generally u-shaped portion of said wings.

* * * * *